United States Patent
Li et al.

(10) Patent No.: US 10,777,957 B2
(45) Date of Patent: Sep. 15, 2020

(54) BRUSH ASSEMBLY, MOTOR AND LIQUID PUMP

(71) Applicant: Johnson Electric S.A., Murten (CH)

(72) Inventors: Min Li, Shenzhen (CN); Jin Jin Wu, Shen Zhen (CN); Kok Ang Chong, Hong Kong (CN)

(73) Assignee: Johnson Electric International AG, Murten (CH)

( * ) Notice: Subject to any disclaimer, the term of this patent is extended or adjusted under 35 U.S.C. 154(b) by 221 days.

(21) Appl. No.: 15/452,253

(22) Filed: Mar. 7, 2017

(65) Prior Publication Data
US 2017/0256900 A1   Sep. 7, 2017

(30) Foreign Application Priority Data

Mar. 7, 2016  (CN) .................... 2016 2 0172283 U

(51) Int. Cl.
| | |
|---|---|
| *H01R 39/38* | (2006.01) |
| *F04D 29/22* | (2006.01) |
| *F04D 13/06* | (2006.01) |
| *H02K 13/00* | (2006.01) |
| *H01R 39/26* | (2006.01) |
| *H02K 5/14* | (2006.01) |

(52) U.S. Cl.
CPC ........... *H01R 39/383* (2013.01); *F04D 13/06* (2013.01); *F04D 29/22* (2013.01); *H01R 39/26* (2013.01); *H02K 5/148* (2013.01); *H02K 13/00* (2013.01)

(58) Field of Classification Search
CPC ......... F04D 13/06; F04D 29/22; H01R 39/26; H01R 39/383; H02K 13/00; H02K 5/148

USPC ......................................................... 310/245
See application file for complete search history.

(56) References Cited

U.S. PATENT DOCUMENTS

| | | | | |
|---|---|---|---|---|
| 3,177,388 A * | 4/1965 | Cook | ..................... | H02K 5/148 310/247 |
| 3,329,844 A * | 7/1967 | Happe | .................. | H01R 39/385 310/239 |
| 4,329,612 A * | 5/1982 | Averill | ................... | H01R 39/40 310/239 |
| 4,990,811 A * | 2/1991 | Nakata | ................. | H01R 39/381 310/239 |
| 6,552,466 B2 * | 4/2003 | Schwabbauer | ...... | H01R 39/045 310/228 |
| 6,559,571 B1 * | 5/2003 | Klode | .................... | H02K 23/18 310/241 |
| 6,922,003 B2 * | 7/2005 | Uchida | .................. | H01R 39/59 310/239 |
| 7,154,203 B2 * | 12/2006 | Nakajima | .............. | H01R 39/41 310/83 |
| 7,501,736 B2 * | 3/2009 | Nakajima | .............. | H02K 5/148 310/239 |
| 9,169,837 B2 * | 10/2015 | Pascual | ................. | F01C 21/007 |
| 2002/0163280 A1 * | 11/2002 | Nakajima | .............. | H01R 39/41 310/239 |
| 2004/0245886 A1 * | 12/2004 | Uchida | .................. | H01R 39/59 310/239 |

(Continued)

*Primary Examiner* — Alex W Mok
(74) *Attorney, Agent, or Firm* — Muncy, Geissler, Olds & Lowe, P.C.

(57) ABSTRACT

A brush assembly includes a brush holder, a brush, an elastic element, and a conductive terminal. The brush slidably is accommodated in the brush holder. The elastic element is resisted between the brush and the brush holder. And the conductive terminal is formed by bending from the brush holder.

18 Claims, 8 Drawing Sheets

(56) References Cited

U.S. PATENT DOCUMENTS

| | | | | |
|---|---|---|---|---|
| 2005/0121994 A1* | 6/2005 | Kong | H01R 39/385 | |
| | | | | 310/239 |
| 2005/0121995 A1* | 6/2005 | Nakajima | H01R 39/41 | |
| | | | | 310/239 |
| 2005/0156477 A1* | 7/2005 | Bocka | H01R 39/385 | |
| | | | | 310/239 |
| 2005/0162035 A1* | 7/2005 | Tsergas | H01R 39/381 | |
| | | | | 310/248 |
| 2005/0189829 A1* | 9/2005 | Thomson | H02K 11/024 | |
| | | | | 310/71 |
| 2005/0253477 A1* | 11/2005 | Ortt | H01R 39/385 | |
| | | | | 310/239 |
| 2005/0269896 A1* | 12/2005 | Yang | H01R 39/381 | |
| | | | | 310/239 |
| 2006/0028088 A1* | 2/2006 | McFarland | H01R 39/385 | |
| | | | | 310/239 |
| 2008/0122303 A1* | 5/2008 | Santo | H02K 5/148 | |
| | | | | 310/51 |
| 2009/0015083 A1* | 1/2009 | Hsieh | H02K 11/40 | |
| | | | | 310/66 |
| 2010/0207483 A1* | 8/2010 | Buttner | H01R 39/385 | |
| | | | | 310/242 |
| 2010/0277032 A1* | 11/2010 | De Filippis | H01R 39/46 | |
| | | | | 310/227 |
| 2012/0062067 A1* | 3/2012 | Shim | H02K 5/148 | |
| | | | | 310/239 |
| 2012/0175979 A1* | 7/2012 | Fu | H02K 5/148 | |
| | | | | 310/71 |
| 2012/0216764 A1* | 8/2012 | Qin | H02K 5/148 | |
| | | | | 123/41.49 |
| 2014/0062266 A1* | 3/2014 | Qin | H01H 85/08 | |
| | | | | 310/68 B |
| 2015/0318652 A1* | 11/2015 | Amonett | H01R 39/04 | |
| | | | | 310/233 |

* cited by examiner

BRUSH ASSEMBLY, MOTOR AND LIQUID PUMP

CROSS REFERENCE TO RELATED APPLICATIONS

This non-provisional patent application claims priority under 35 U.S.C. § 119(a) from Patent Application No. 201620172283.2 filed in The People's Republic of China on Mar. 7, 2016.

FIELD OF THE INVENTION

This invention relates to motors, in particular to a brush assembly and a motor using the brush assembly and a liquid pump using the motor.

BACKGROUND OF THE INVENTION

A current direction flowing into an armature of a brush motor is changed by a sliding electric connection between a brush assembly and a commutator. And a changing magnetic field is generated in the armature of the motor and drives a rotor of the motor to drive.

The brush assembly generally comprises a brush holder and a brush. The brush holder comprises a conductive terminal fastened to the brush holder body by welding or riveting. A production cost of the brush assembly is increased by welding or riveting the conductive terminal to the brush holder. When a motor vibration generated, a connection between the conductive terminal and the brush holder can be loosened, and the motor can break down.

Below, embodiments of the present invention will be described in detail with reference to the accompanying drawings.

DETAILED DESCRIPTION OF THE PREFERRED EMBODIMENTS

The technical solutions of the embodiments of the present invention will be clearly and completely described as follows with reference to the accompanying drawings. Apparently, the embodiments as described below are merely part of, rather than all, embodiments of the present invention. Based on the embodiments of the present disclosure, any other embodiment obtained by a person skilled in the art without paying any creative effort shall fall within the protection scope of the present invention.

It is noted that, when a component is described to be "fixed" to another component, it can be directly fixed to the another component or there may be an intermediate component, i.e. indirectly fixed to the another component through a third component. When a component is described to be "connected" to another component, it can be directly connected to the another component or there may be an intermediate component. When a component is described to be "disposed" on another component, it can be directly disposed on the another component or there may be an intermediate component.

Unless otherwise specified, all technical and scientific terms have the ordinary meaning as understood by people skilled in the art. The terms used in this disclosure are illustrative rather than limiting. The term "and/or" as used in this disclosure means that each and every combination of one or more associated items listed are included.

Figure 1:
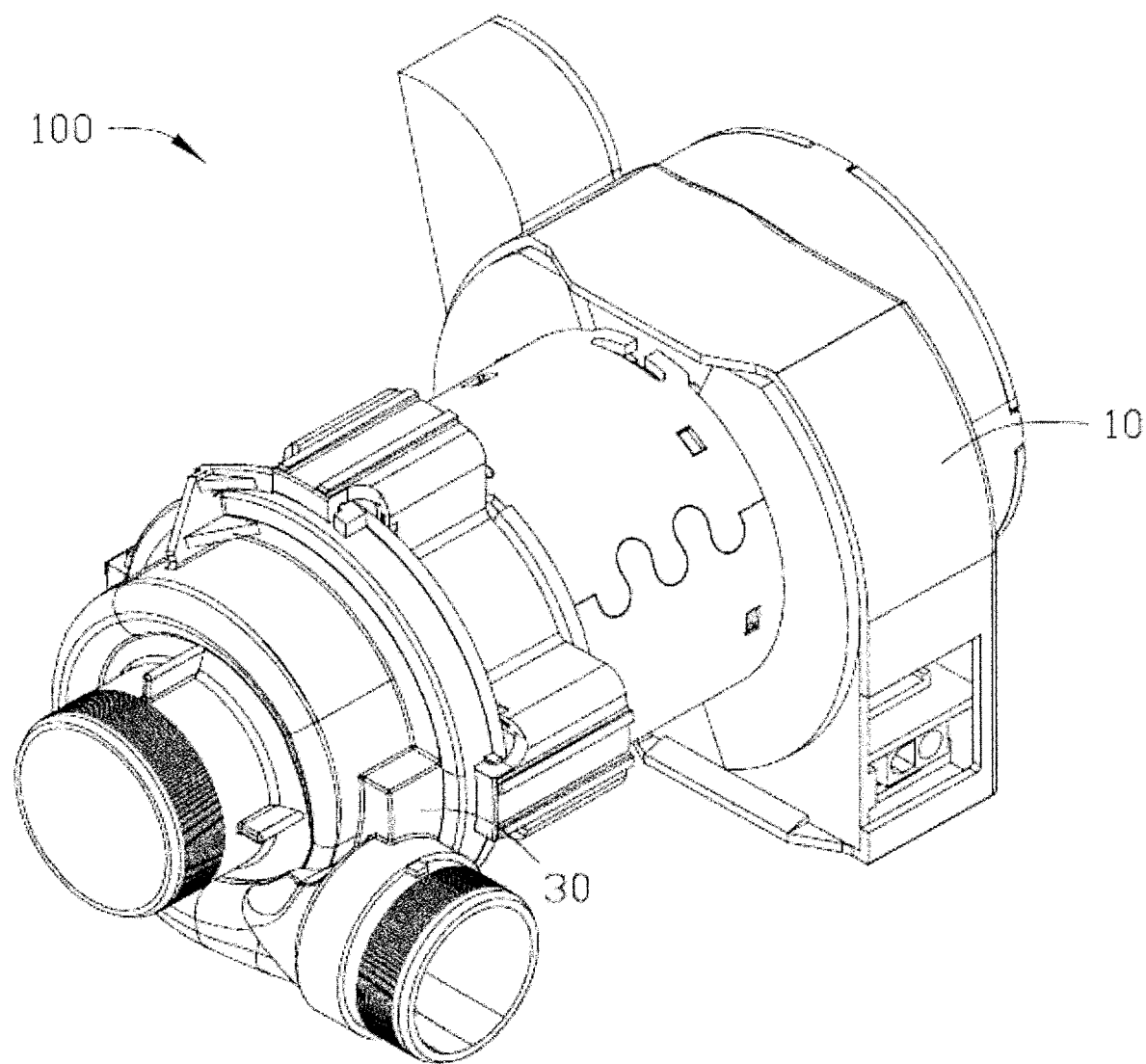
FIG. 1 is a schematic view of the liquid pump according to one embodiment of the present disclosure.

Referring to FIG. 1, an embodiment of the present disclosure provides a liquid pump 100, which is used in a dishwasher, a washing machine, or the like, for water circulation or/and discharge. The liquid pump 100 comprises at least a motor 10 and a pump 30. And the pump 30 comprises an impeller 20, the motor 10 is connected to the pump 30 and drives the impeller 20 of the pump 30 to rotate, so a vacuum suction is generated in the pump 30 to realize liquid circulation or/and discharge.

Figure 2:
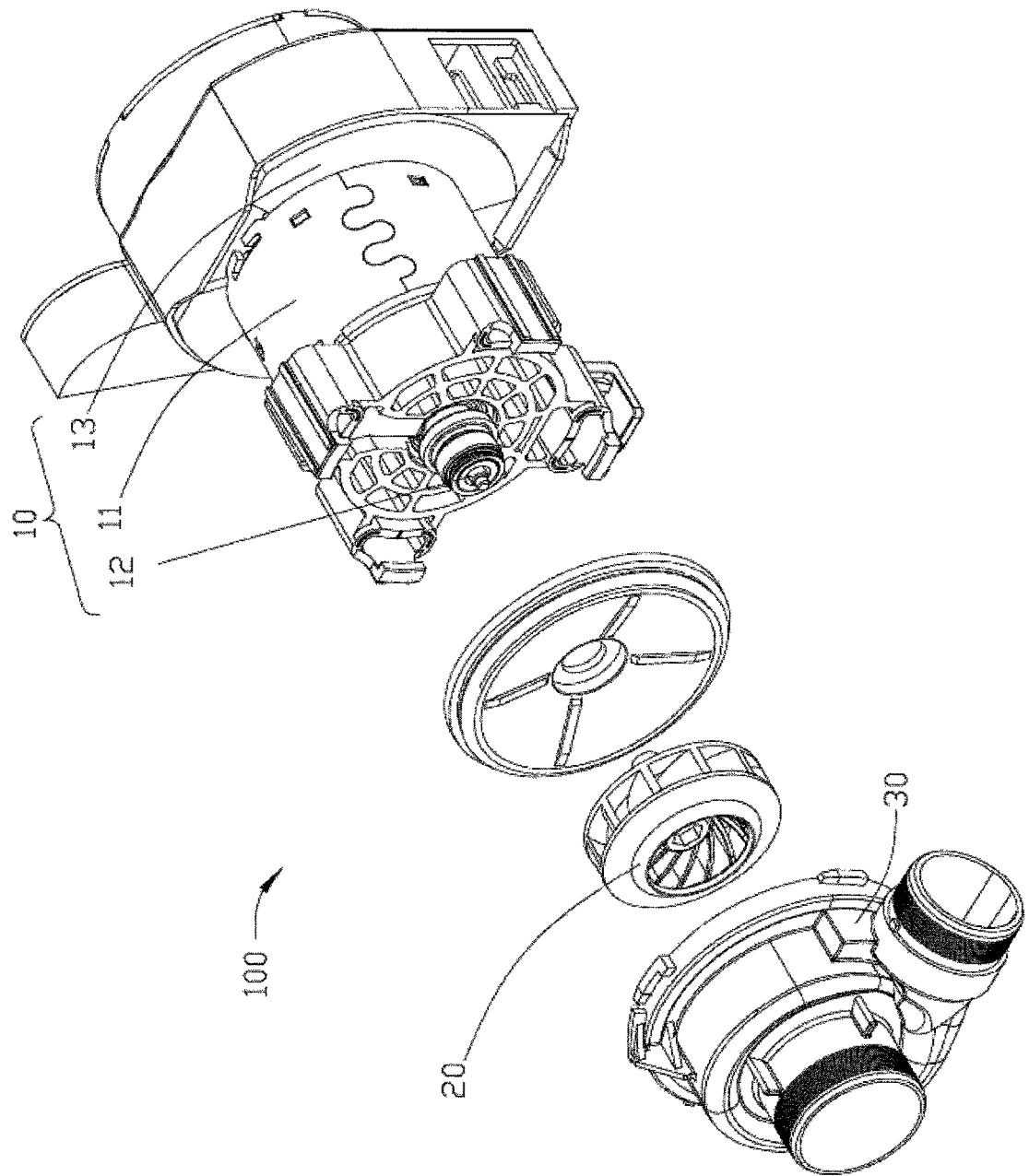
FIG. 2 is a partially exploded view of the liquid pump as shown in FIG. 1.
Figure 3:
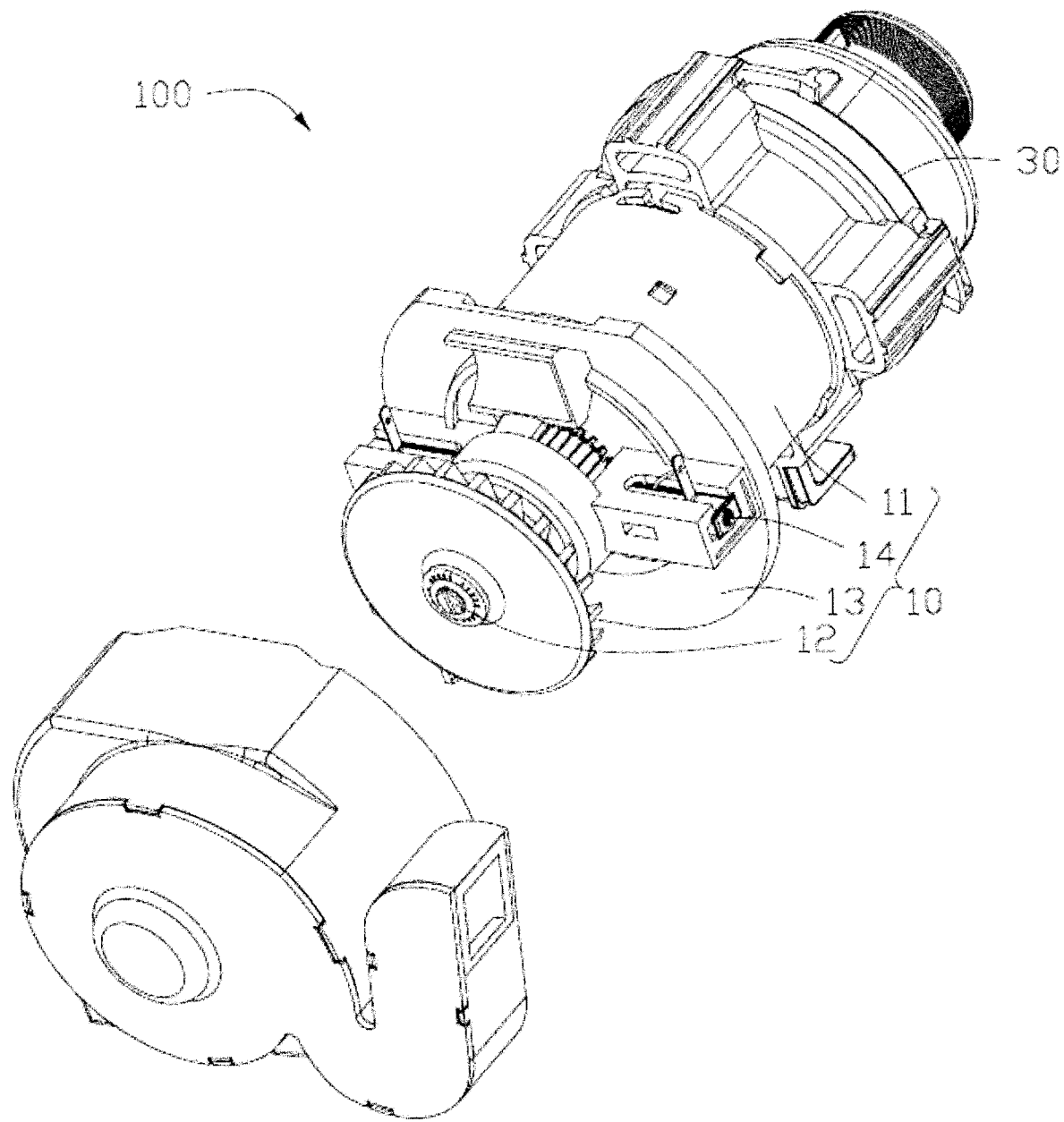
FIG. 3 is an exploded view of another part of the liquid pump as shown in FIG. 1.

Referring also to FIG. 2 and FIG. 3, the motor 10 comprises a casing 11, a stator and a rotor (not labelled) mounted in the casing 11, the rotor rotates to drive a shaft 12, an end cap 13 mounted in one end of the casing for fixing the shaft and a brush assembly 14.

Figure 4:
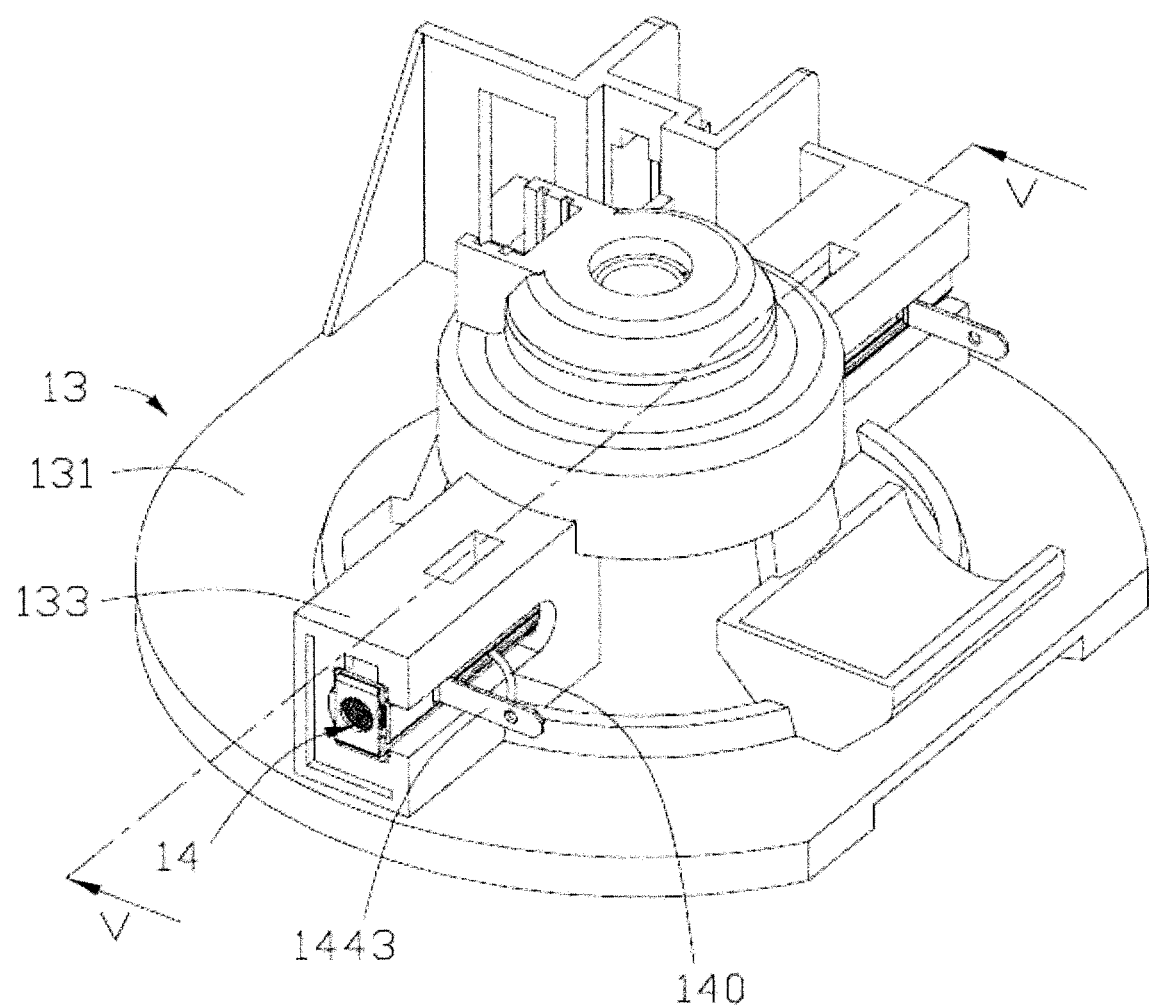
FIG. 4 is a schematic view of the end cap as shown in FIG. 1.
Figure 5:
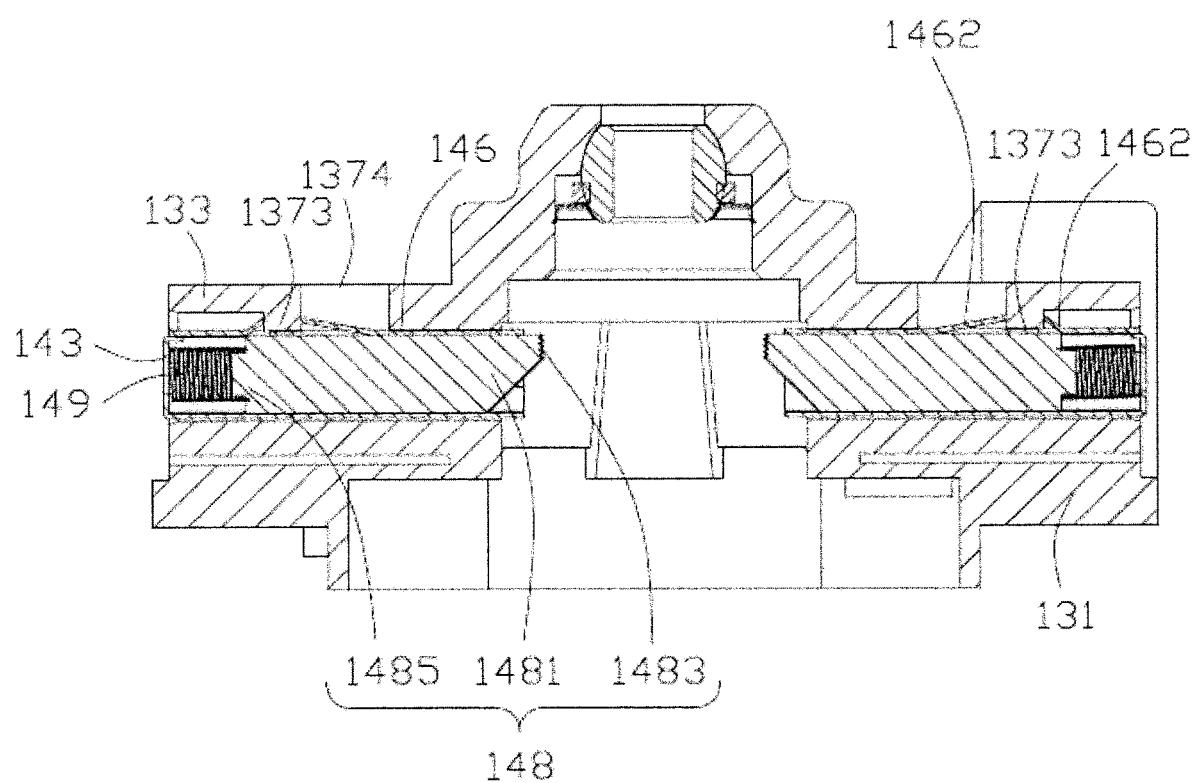
FIG. 5 is a section view of the end cap as shown in FIG. 4 along line V-V.
Figure 6:
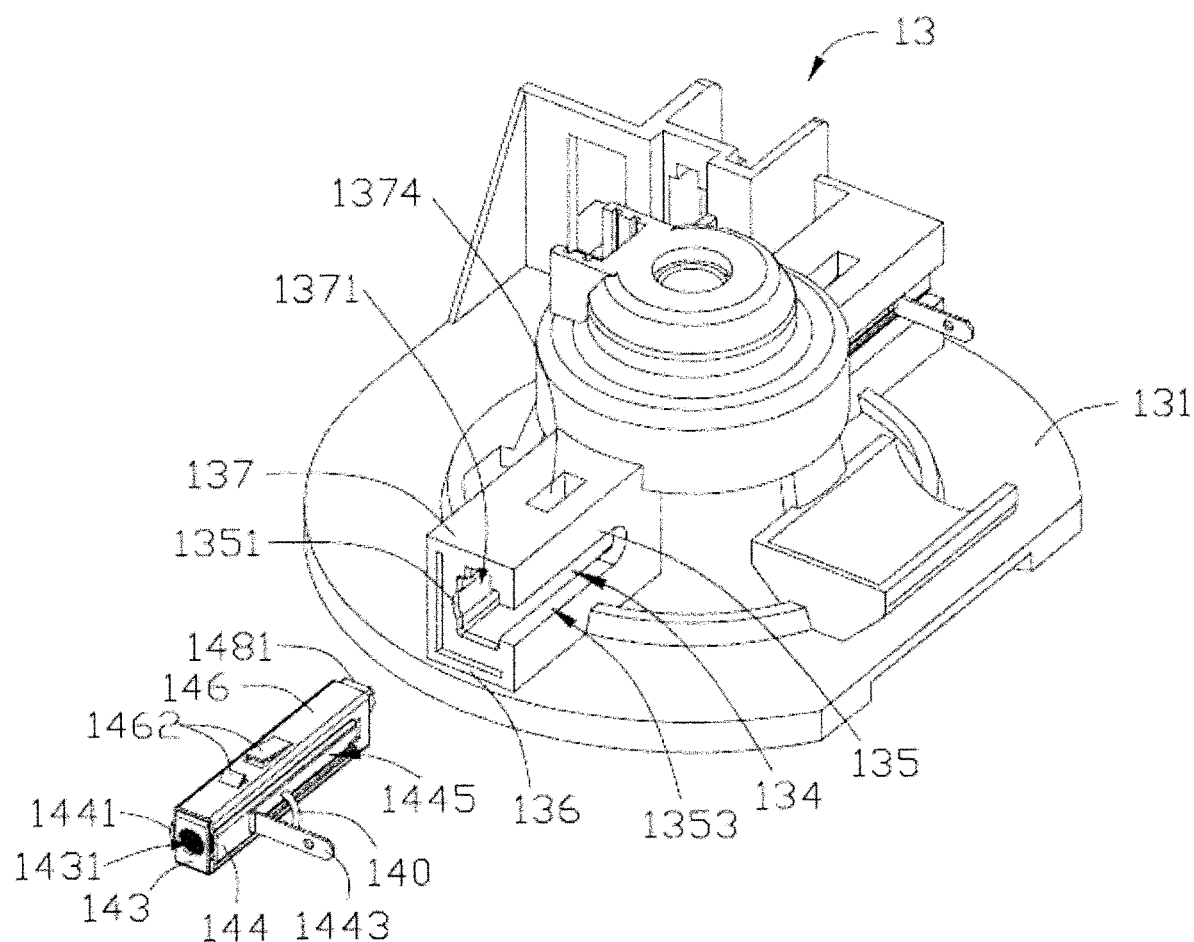
FIG. 6 is a partially exploded view of the end cap as shown in FIG. 1.

Referring to FIGS. 4-6, the end cap 13 comprises a body 131 and two accommodating portions 133 for accommodating the brush assembly 14. In the embodiment, the body 131 is a hollow annular structure and the two accommodating portions 133 are disposed opposite to each other along a radial direction of the body 131. The accommodating portion 133 is generally a box structure for accommodating the brush assembly 14. The accommodating portion 133 comprises two side plates 135 which are disposed opposite to each other, a bottom plate 136 and a top plate 137 connected to the two side plates 135. The two side plates 135, the top plate 137 and the bottom plate 136 form the accommodating portion 133. The brush assembly 14 is slidably mounted in the accommodating portion 133 (as shown in FIG. 6). In another embodiment, a number of the accommodating portion 133 can be adjusted in accordance with a number of the brushes of the motor 10.

Referring to FIG. 6, a recess 1351 is internally defined in one of the side plate 135 for assisting in fixing the brush assembly 14. A guide groove 1353 is defined in the other side plate 135. The brush assembly 14 is capable of sliding along the guide groove 1353.

A sliding groove 1371 is internally defined in the top plate 137, whose extending direction is the same as that of the guide groove 1353. A block 1373 is arranged at a roughly middle position of the sliding groove 1371. The top plate 137 defines a through hole 1374 at the side of the block 1373 near the axis of the body 131. The through hole 1374 is communicated with the sliding groove 1371 for heat dissipation of the brush assembly 14. The block 1373 is configured to hold the brush assembly 14, thus to fix the brush assembly 14 in the accommodating portion 133.

Figure 7:
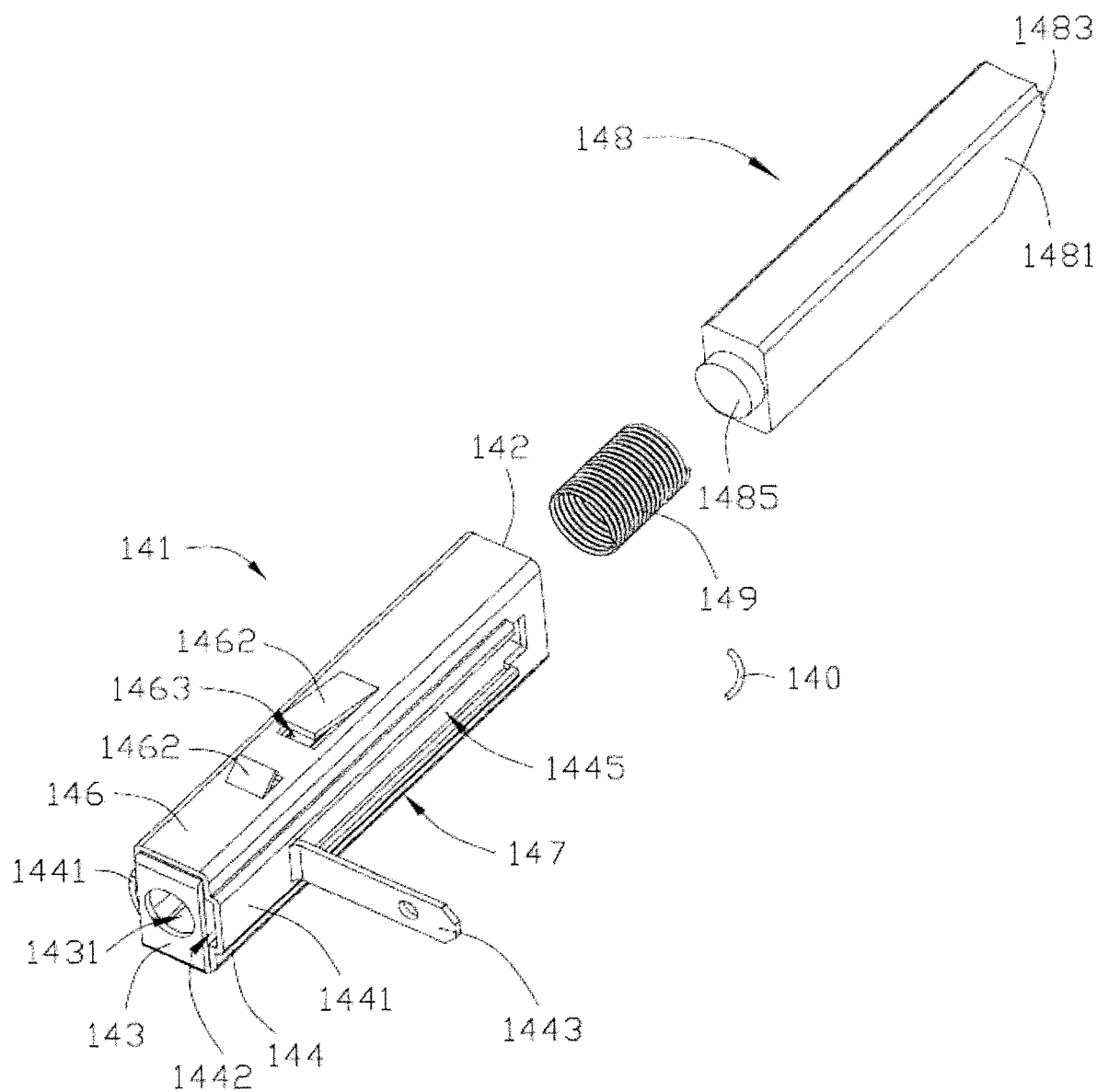
FIG. 7 is an exploded view of the brush assembly as shown in FIG. 6.
Figure 8:
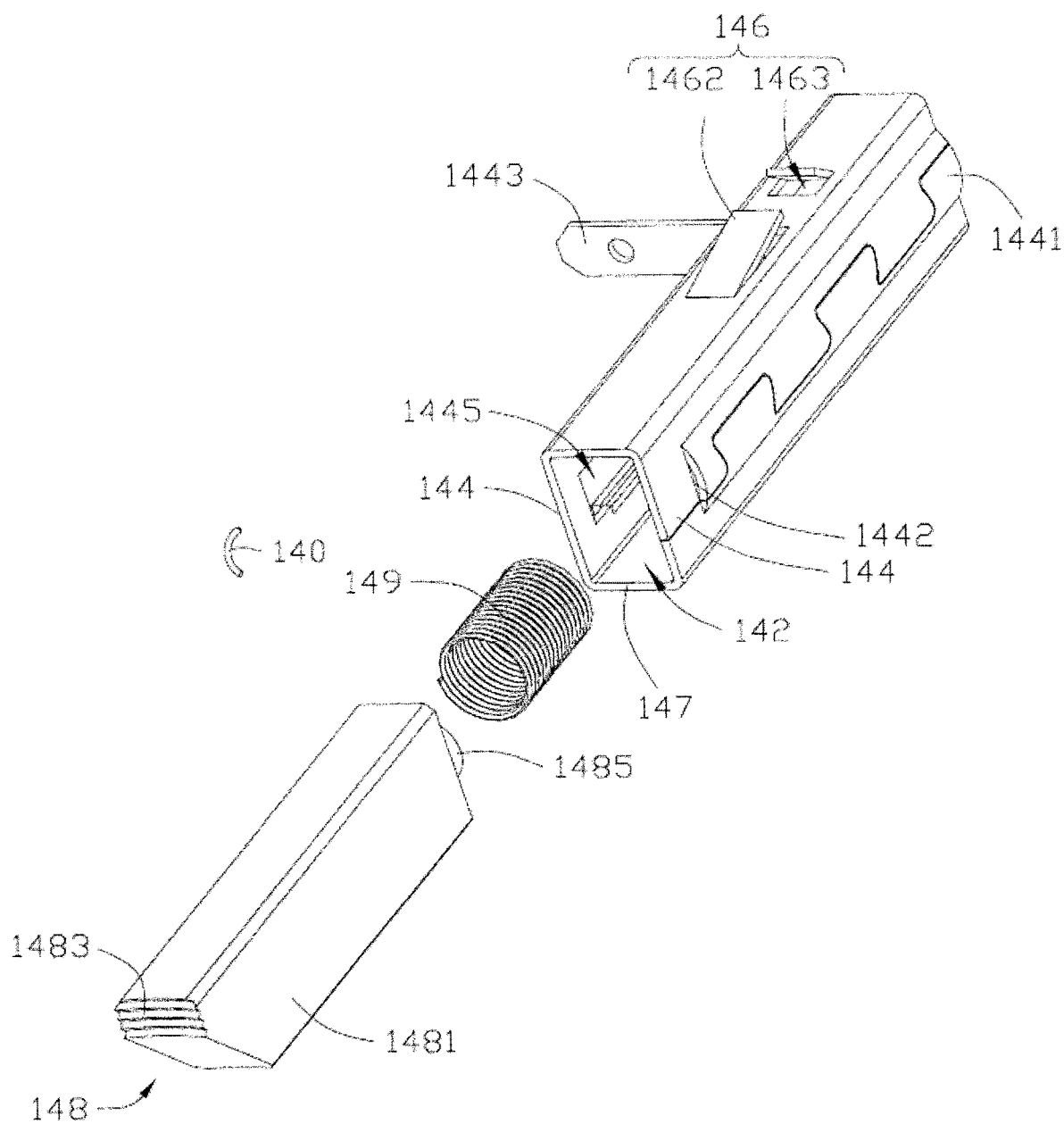
FIG. 8 is an exploded view of the brush assembly as shown in FIG. 6 in another direction.

Referring also to FIG. 7 and FIG. 8, the brush assembly 14 comprises a brush holder 141, and a brush 148 slidably mounted in the brush holder 141, and an elastic element 149. The brush holder 141 is generally a hollow cuboid, which comprises an accommodating cavity 142 extending along the axis of the brush holder 141, the brush 148 is slidably mounted in the accommodating cavity 142. The elastic element 149 is accommodated in the accommodating cavity 142.

The brush holder 141 further comprises an end wall 143, two side walls 144, a top wall 146 and a bottom wall 147 connecting the two side walls 144. The end wall 143, two side walls 144, the top wall 146 and bottom wall 147 enclose the accommodating cavity 142 together. In the embodiment, the end wall 143 defines at least one ventilation hole 1431 running through to the accommodating cavity 142. Each side wall 144 is convexly provided with a hollow bulge 1441 in a direction deviating from the direction (outside of the brush holder 141) of the axis of the brush holder 141, and each bulge 1441 defines internally a groove 1442, the groove 1442 of each bulge 1441 runs through to the accommodating cavity 142. The hollow bulge 1441 can reduce the sliding contact area between the brush 148 and the brush holder 141, thereby an abrasion of the brush 148 and heat generation of the entire brush assembly 14 can be reduced.

The brush holder 141 further comprises a conductive terminal 1443, which is used for electrically connecting the brush assembly 14 to an external power source (not shown). In the embodiment, the conductive terminal 1443 is formed by punching and bending a part of the bulge 1441, so that the conductive terminal 1443 and the brush holder 141 form an integrated structure, and the conductive terminal 1443 will not loose and fall off. A notch part 1445 is formed on the bulge 1441 after bending the conductive terminal 1443, and the notch part 1445 enhances the heat dissipation capacity of the brush assembly 14. In the embodiment, the conductive terminal 1443 is perpendicular to the bulge 1441.

The top wall 146 is outer convexly defined with at least two elastic sheets 1462. In the embodiment, each elastic sheet is formed by punching and bending a part of the top wall 146. The elastic sheet 1462 serves to limit the brush assembly 14 in the accommodating portion 133. Each elastic sheet 1462 is elongated in shape and is resilient to a certain extent, one end of the elastic sheet 1462 upwarps from the top wall 146 in a direction deviating from the brush holder 141.

The upwarping ends of the two elastic sheets 1462 are opposite to each other, and there are two ventilation holes 1463 formed corresponding to the elastic sheet 1462, so as the heat dissipation capacity of the brush assembly 14 is enhanced.

The brush 148 is generally a cuboid structure, and one end of the brush 148 comprises a friction part 1481 that is slidably electrically connected to the commutator (not labelled). The friction part 1481 is a trapezoid boss provided at the endmost of the brush 148. A plurality of ribs 1483 are provided on the friction part 1481 at regular intervals, the plurality of ribs 1483 are configured to generate a stable electrical connection between the brush 148 and the commutator.

The other end of the brush 148 is provided with a convex column 1485, and the elastic element 149 resists one end of the brush 148 and sleeved on the convex column 1485. During the operation of the brush assembly 14, the elastic element 149 is used to elastically drive the brush 148 along the accommodating cavity 142 and to make the brush 148 contact with the commutator.

The brush assembly 14 further comprises a brush pigtail 140, and one end of the brush pigtail 140 is connected to one end of the conductive terminal 1443 that is remote from the notch part 1445, and the other end runs through the notch part 1445 and connects to the brush 148. The brush pigtail 140 makes the electrical connection between the brush holder 141 and the brush 148 more stable and to prevent bad electrical contact that may occur during the sliding process of the brush 148 along the brush holder 141. The brush pigtail 140 provides a double protection for the electrical connection between the brush 148 and the brush holder 141.

Referring again to FIG. 4 and FIG. 5, a brief description of the assembling process and the working process of the brush assembly 14 with reference to the drawings is given.

Inserting the elastic element 149 from the open end of the accommodating cavity 142 and making the elastic element 149 contact with the end wall 143 of the accommodating cavity 142. The end of the brush 148 with the convex column 1485 is enclosed to the open end of the accommodating cavity 142 to make the end of the elastic element 149 deviating from the end wall 143 sleeve on the convex column 1485. One end of the assembled brush assembly 14 with the friction portion 1481 is inserted into the through hole 134 of the accommodating portion 133, so as to make the conductive terminal 1443 on the bulge 1441 to slide along the guide groove 1351, (as shown in FIG. 6), the other bulge 1441 to slide along the recess 1351, and the two elastic sheets 1462 to slide along the sliding groove 1371. During the sliding movement of the elastic sheet 1462 along the sliding groove 1371, one end of each elastic sheet 1462 resists a groove wall of the sliding groove 1371. The elasticity recovers when one of the elastic sheet 1462 slides into the through hole 1374, and the block 1373 is held between the two elastic sheet 1462, and then the assemble of the brush assembly 14 is completed.

The conductive terminal 1443 of the brush assembly 14 as stated in the present disclosure is formed by bending the side wall of the brush holder 141, thereby the brush assembly 14 boasts a compact structure and more stable power supply, moreover. And an integrated design can reduce the manufacturing cost and process and prevented the loss of conductive terminal 1443.

Although the invention is described with reference to one or more embodiments, the above description of the embodiments is used only to enable people skilled in the art to practice or use the invention. It should be appreciated by those skilled in the art that various modifications are possible without departing from the spirit or scope of the present invention. The embodiments illustrated herein should not be interpreted as limits to the present invention, and the scope of the invention is to be determined by reference to the claims that follow.

The invention claimed is:
1. A brush assembly comprising:
a brush holder comprising:
    two side walls provided opposite to each other;
    a top wall connecting the two side walls; and
    a bottom wall connecting the two side walls;
a brush slidably accommodated in the brush holder;
an elastic element resisted between the brush and the brush holder; and
a conductive terminal formed by bending from the brush holder;
wherein the conductive terminal is integrally formed in a side wall of the brush holder, a portion of the side wall being bent outwards forming the conductive terminal and leaving a hole in the side wall, and
wherein each of the two side walls is convex outwardly to form a bulge, and the hole is formed on the bulge of the side wall where the conductive terminal is formed.

2. The brush assembly of claim 1, wherein the conductive terminal is formed by bending outwardly a middle part of one of the bulge.

3. The brush assembly of claim 2, wherein the conductive terminal is perpendicular to the bulge.

4. The brush assembly of claim 3, wherein the brush assembly further comprises a brush pigtail, and one end of the brush pigtail is connected to the conductive terminal, the other end runs through the hole and connects to the brush.

5. The brush assembly of claim 2, wherein the top wall defines convexly at least two elastic sheets in a direction deviating from the brush holder.

6. The brush assembly of claim 5, wherein each elastic sheet is elongated in shape and has elasticity, and one end of the elastic sheet upwarps in a direction deviating from the brush holder.

7. The brush assembly of claim 5, wherein are two ventilation holes are formed on the top wall corresponding to the two elastic sheets.

8. The brush assembly of claim 2, wherein one end of the brush comprises a friction part, which is a trapezoid boss provided at the endmost of the brush, and a plurality of ribs are provided on the friction part at regular intervals.

9. The brush assembly of claim 8, wherein the other end of the brush is provided with a convex column, and one end of the elastic element is sleeved in the convex column.

10. The brush assembly of claim 1, wherein the brush holder further comprises an end wall, the two side walls, the end wall, the top wall and the bottom wall enclose an accommodating cavity, the brush is slidably accommodated in the accommodating cavity, and one end of the elastic element resists the end wall and the other end resists against the brush, and the end wall defines at least one ventilation hole running through to the accommodating cavity.

11. A motor comprising:
 a casing;
 a stator mounted in the casing;
 a rotor mounted in the casing; and
 an end cap arranged in one end of the casing and defining at least one accommodating cavity to receive a brush assembly, the brush assembly comprises:
  a brush holder comprising:
   two side walls provided opposite to each other;
   a top wall connecting the two side walls; and
   a bottom wall connecting the two side walls;
  a brush slidably accommodated in the brush holder;
  an elastic element resisted between the brush and the brush holder; and
  a conductive terminal formed by bending from the brush holder;
 wherein the conductive terminal is integrally formed in a side wall of the brush holder, a portion of the side wall being bent outwards forming the conductive terminal and leaving a hole in the side wall, and wherein each of the two side walk is convex outwardly to form a bulge, and the hole is formed on the bulge of the side wall where the conductive terminal is formed.

12. The motor of claim 11, wherein the at least one accommodating cavity comprises two side plates opposite to each other, and a guide groove is defined in one of the side plates for slidably guiding the conductive terminal of the brush holder.

13. The motor of claim 12, wherein the top wall defines convexly at least two elastic sheets in a direction deviating from the brush holder.

14. The motor of claim 13, wherein each elastic sheet is elongated in shape and has elasticity, and one end of the elastic sheet upwarps in a direction deviating from the brush holder.

15. The motor of claim 12, wherein one end of the brush comprises a friction part, which is a trapezoid boss provided at the endmost of the brush, and a plurality of ribs are provided on the friction part at regular intervals.

16. The motor of claim 15, wherein the other end of the brush is provided with a convex column, and one end of the elastic element is sleeved in the convex column.

17. The motor of claim 11, wherein the at least one accommodating cavity comprises two side plates opposite to each other, a bottom plate and a top plate, the top plate defining a through hole which is communicated with the accommodating cavity.

18. A liquid pump comprising:
 a pump;
 a motor driving the pump; wherein the motor comprises a casing;
 a stator mounted in the casing;
 a rotor mounted in the casing; and
 an end cap arranged in one end of the casing and defining at least one accommodating cavity to receive a brush assembly, the brush assembly comprises:
  a brush holder comprising:
   two side walls provided opposite to each other;
   a top wall connecting the two side walls; and
   a bottom wall connecting the two side walls;
  a brush slidably accommodated in the brush holder;
  an elastic element resisted between the brush and the brush holder; and
  a conductive terminal formed by bending from the brush holder;
 wherein the conductive terminal is integrally formed in a side wall of the brush holder, a portion of the side wall being bent outwards forming the conductive terminal and leaving a hole in the side wall, and
 wherein each of the two side walls is convex outwardly to form a bulge, and the hole is formed on the bulge of the side wall where the conductive terminal is formed.

* * * * *